United States Patent
Hess et al.

(10) Patent No.: US 11,085,581 B2
(45) Date of Patent: Aug. 10, 2021

(54) LUBRICATING-GREASE PUMP AND METHOD FOR RECOVERY OF LEAKAGE GREASE OF A LUBRICATING-GREASE PUMP

(71) Applicant: SKF Lubrication Systems Germany GmbH, Walldorf (DE)

(72) Inventors: Dieter Hess, Ludwigshafen (DE); Juergen Kreutzkaemper, Waibstadt-Daisbach (DE); Andreas Schoenfeld, Sankt Leon-Rot (DE); Stefan Schuermann, Walldorf (DE)

(73) Assignee: AKTIEBOLAGET SKF, Gothenburg (SE)

( * ) Notice: Subject to any disclaimer, the term of this patent is extended or adjusted under 35 U.S.C. 154(b) by 413 days.

(21) Appl. No.: 16/185,551

(22) Filed: Nov. 9, 2018

(65) Prior Publication Data

US 2019/0170295 A1 Jun. 6, 2019

(30) Foreign Application Priority Data

Dec. 4, 2017 (DE) .......................... 102017221847.9

(51) Int. Cl.
*F16N 13/22* (2006.01)
*F16N 13/00* (2006.01)
*F04B 15/02* (2006.01)
*F16N 11/10* (2006.01)
*F16N 29/00* (2006.01)
(Continued)

(52) U.S. Cl.
CPC .............. *F16N 13/22* (2013.01); *F04B 15/02* (2013.01); *F04B 49/10* (2013.01); *F04B 53/04* (2013.01); *F04B 53/16* (2013.01); *F16N 11/10* (2013.01); *F16N 13/00* (2013.01); *F16N 29/00* (2013.01); *F16N 31/00* (2013.01); *F04B 1/00* (2013.01); *F04B 9/10* (2013.01); *F04B 2201/0208* (2013.01)

(58) Field of Classification Search
CPC .......... F16N 31/00; F16N 11/10; F16N 11/04; F16N 13/02; F04B 9/103; F04B 53/04; F04B 2201/0208; F04B 15/02; F04B 49/10
USPC ....................................................... 184/6.28
See application file for complete search history.

(56) References Cited

U.S. PATENT DOCUMENTS 4,062,425 A * 12/1977 O'Dell ...................... F16N 5/02
184/105.2
9,097,385 B2 * 8/2015 Gurney ................. F16K 15/183
(Continued)

*Primary Examiner* — Michael R Mansen
*Assistant Examiner* — Mark K Buse
(74) *Attorney, Agent, or Firm* — J-Tek Law PLLC; Scott T. Wakeman; Mark A. Ussai

(57) ABSTRACT

A lubricating-grease pump includes a pumping chamber, a leakage accumulation chamber, a seal configured to substantially seal the pumping chamber from the leakage accumulation chamber, at least one outlet from the pumping chamber, and at least one leakage-recovery arrangement configured to guide a quantity of grease that has leaked from the pumping chamber into the leakage accumulation chamber back into the pumping chamber. The leakage-recovery arrangement may include a first passageway connecting the leakage accumulation chamber to a storage region, a second passageway connecting the first passageway to the pumping chamber and a spring-biased piston in the storage region.

9 Claims, 1 Drawing Sheet

(51) Int. Cl.
*F04B 53/04* (2006.01)
*F04B 49/10* (2006.01)
*F04B 53/16* (2006.01)
*F16N 31/00* (2006.01)
*F04B 9/10* (2006.01)
*F04B 1/00* (2020.01)

(56) References Cited

U.S. PATENT DOCUMENTS

2006/0219482 A1* 10/2006 Tung .................. F16N 3/12
  184/105.2
2017/0298916 A1* 10/2017 Teylor ................ F04B 17/042

* cited by examiner

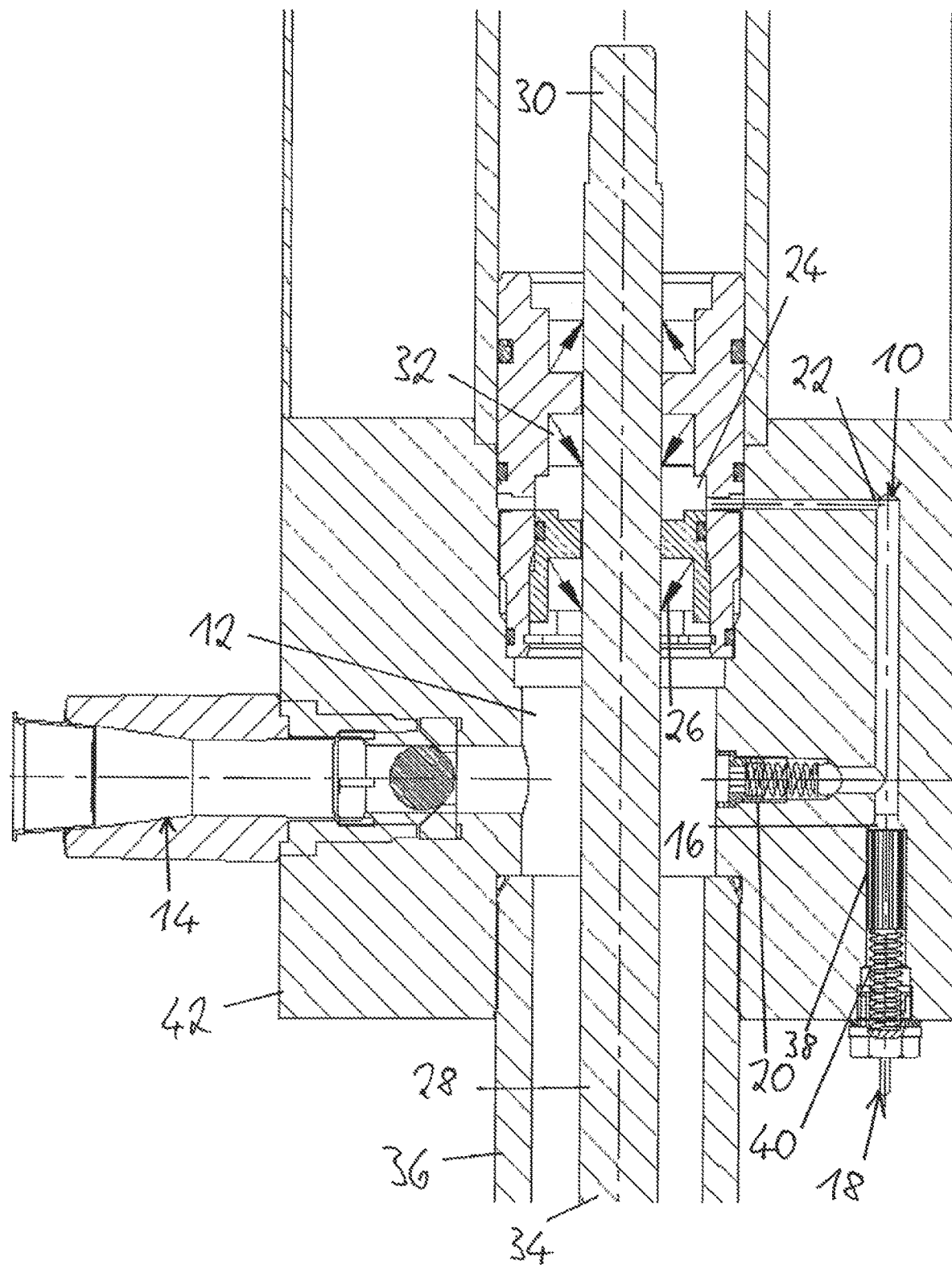

LUBRICATING-GREASE PUMP AND METHOD FOR RECOVERY OF LEAKAGE GREASE OF A LUBRICATING-GREASE PUMP

CROSS-REFERENCE

This application claims priority to German patent application no. 10 2017 221 847.9 filed on Dec. 4, 2018, the contents of which are fully incorporated herein by reference.

TECHNOLOGICAL FIELD

The disclosure is directed to a lubricating-grease pump.

BACKGROUND

Lubricating-grease pumps known that can be used for central lubrication in excavators.

Pumps for pumping oil are known, for example, from the publications DE202007004161U1, DE19900564 A1, EP955466A1 (US family member U.S. Pat. No. 6,129,533), and DE10316316A1 (US family member U.S. Pat. No. 7,566,293). A leakage of oil can occur in any of these pumps.

SUMMARY

An aspect of the disclosure comprises improving a lubricating-grease pump with respect to its efficiency.

According to the disclosure, a lubricating-grease pump includes at least one leakage-recovery arrangement, which is provided to guide leakage grease into a chamber of the pump, from which the leakage grease is pumpable through an outlet of the lubricating-grease pump. "Provided" shall be understood in particular to mean specifically designed and/or specifically equipped and/or specifically programmed. According to the disclosure a more efficient lubricating-grease pump can be provided. In particular, leakages can be permanently avoided, whereby the reliability of the lubricating-grease pump increases, because leaks can lead to a failure of the lubricating-grease pump. Moreover, in particular grease can be prevented from escaping into the environment, whereby fire risk and risk of slipping on machine footplates or hall floors is reduced.

Another aspect of the disclosure comprise a lubricating-grease pump having a pumping chamber, a leakage accumulation chamber, a seal configured to substantially seal the pumping chamber from the leakage accumulation chamber, and at least one outlet from the pumping chamber. There is a first check valve in the at least one outlet configured to permit a unidirectional flow of grease out of the pumping chamber. A first passage connects the leakage accumulation chamber to a storage chamber, and a second passage connects the first passage to the pumping chamber, and there is a second check valve in the second passage. There is also a spring-biased piston in the storage chamber and an indicator pin having a first end facing the piston, a second end outside the storage chamber and a central portion slidably mounted in a body of material forming a seal for the storage chamber.

Further advantages arise from the following description of the drawing. An exemplary embodiment of the disclosure is depicted in the drawing. The drawing, the description, and the claims contain numerous features in combination. The person skilled in the art will also advantageously consider the features individually and combine them into further meaningful combinations.

BRIEF DESCRIPTION OF THE DRAWING

FIG. 1 is an axial section through a lubricating-grease pump according to an embodiment of the present disclosure.

DETAILED DESCRIPTION

FIG. 1 is an axial section through a lubricating-grease pump according to an embodiment of the present disclosure, which pump includes an outlet 14 and a piston rod 28 that moves back and forth along its axial direction during an operation of the lubricating-grease pump. In a fully installed state a cylinder (not shown) is attached to an end 30 of the piston rod 28 such that the back-and-forth movement of the piston rod 28 can be effected hydraulically. Alternatively other methods for moving the piston rod 28 are of course conceivable. The lubricating-grease pump further comprises a chamber 12 that is configured as a pumping space. A further cylinder (not shown) wherein check valves are introduced is attached to a region 34 of the piston rod 28.

During an operation of the lubricating-grease pump the region 34 and the further cylinder move back and forth in a hollow cylinder 36 of the lubricating-grease pump. A first end of the hollow cylinder 36 faces the pumping space. A second end of the hollow cylinder 36, which second end opposes the first end, is connected to a lubricating-grease supply. If the piston rod 28 moves away from the lubricating-grease supply, then the further cylinder sucks lubricating grease from the lubricating-grease supply via an inlet valve into the hollow cylinder. If the piston rod 28 then moves back toward the lubricating-grease supply, then the inlet valve is closed and the check valves on the further cylinder are opened so that the previously sucked-in lubricating grease enters the pumping space. If the piston rod 28 then moves away again from the lubricating-grease supply, then the check valves in the further cylinder are closed and the lubricating grease located in the pumping space is pressed through the outlet 14 and through a valve located there.

At a region of the pumping space that is facing away from the lubricating-grease supply the piston rod 28 is sealed by a seal 26 and a subsequent high-pressure seal 32. The seal 26 may also be configured as a high-pressure seal. A chamber 24 of the lubricating-grease pump is disposed between the seal 26 and the high-pressure seal 32. If the seal 26 leaks, leakage grease can accumulate in the chamber 24. The lubricating-grease pump includes a leakage-recovery arrangement 10 configured to return leakage grease that has accumulated in the chamber 24 to the chamber 12, which is the pumping space. The leakage-recovery arrangement comprises a storage region 16 that is provided for storing leakage grease. The storage area is connected to the chamber 24 by a channel 22 that is formed by two bores. If enough leakage grease accumulates in the chamber 24, then it is automatically pressed through the channel 22 into the storage region 16, whereby the storage region 16 is enlarged. The storage region is variable with respect to its volume. This is realized by the leakage-recovery arrangement including a piston 38 and a coil spring 40, and the piston 38 being movably supported in a bore of a housing 42 of the lubricating-grease pump. A movement of the piston along the bore enlarges the storage region 16, simultaneously presses onto the coil spring 40 and also moves an indicator pin 18 of the leakage-recovery arrangement. The greater the volume of the storage region 16, the farther the pin 18 protrudes out of the housing 42, whereby a fill level of the storage region 16 can be read from the outside. The pin 18 has a memory function. It is not fixedly connected to the piston 38 but rather supported by a soft seal such that after a displacing by the piston 38 the pin can be brought into its original position only by a pressing-back from outside the housing 42. This means that during an operation of the lubricating-grease pump the pin 18 does not indicate a current fill level of the storage region 16 but rather a last maximum fill level thereof.

The pumping space is coupled to the storage region 16 by a pressure-relief valve 20. Alternatively or additionally the leakage-recovery arrangement can include a check valve that couples the pumping space and the storage region 16.

With a pressure stroke of the lubricating-grease pump the pressure-relief valve is under pressure such that the leakage grease disposed in the storage region 16 cannot escape through the pressure-relief valve. As soon as the lubricating-grease pump begins with the suction stroke the pumping space is pressure-relieved. The piston 38 is thereby moved by the coil spring such that the leakage grease that is disposed in the storage region 16 is displaced into the pumping space by the pressure-relief valve. This can occur because the storage region 16 is connected to an end of the pressure-relief valve by a bore. The leakage grease that is pumped back into the pumping space in this manner is subsequently pumped through the outlet 14.

The lubricating-grease pump can be the pump of a central lubrication system of an excavator.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved lubrication-grease pump.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Leakage-recovery arrangement
12 Chamber
14 Outlet
16 Storage region
18 Indicator unit
20 Pressure-relief valve
22 Channel
24 Chamber
26 Seal
28 Piston rod
30 End
32 High-pressure seal
34 Region
36 Hollow cylinder
38 Piston
40 Coil spring
42 Housing

What is claimed is:

1. A lubricating-grease pump comprising:
   a pumping chamber;
   a leakage accumulation chamber;
   a seal configured to seal the pumping chamber from the leakage accumulation chamber;
   at least one outlet from the pumping chamber; and
   at least one leakage-recovery arrangement configured to guide a quantity of grease that has leaked from the pumping chamber into the leakage accumulation chamber back into the pumping chamber;
   wherein the leakage-recovery arrangement includes a storage region configured to store the quantity of grease and a piston in the storage region, the piston being movable from a first position to a second position to change a volume of the storage region.

2. The lubricating-grease pump according to claim 1, wherein the leakage-recovery arrangement includes an indicator for indicating a fill level of the storage region.

3. The lubricating-grease pump according to claim 2, wherein the indicator comprises a pin baying a first end facing the piston, a second end outside the storage region and a central portion slidably mounted in a body of material forming a seal for the storage region.

4. The lubricating-grease pump according to claim 2, wherein the lubricating-grease pump includes at least one check valve and/or at least one pressure-relief valve, through which the storage region is at least partially emptiable.

5. The lubricating-grease pump according to claim 1, wherein the leakage-recovery arrangement includes at least one channel extending from the leakage accumulation chamber to the storage region.

6. The lubricating-grease pump according to claim 1, wherein the lubricating-grease pump is configured for a central lubrication system of an excavator.

7. The lubricating-grease pump according to claim 1, wherein the leakage-recovery arrangement comprises:
   a first passage connecting the leakage accumulation chamber to a storage chamber;
   a second passage connecting the first passage to the pumping chamber;
   a second check valve in the second passage;
   a spring-biased piston in the storage chamber; and
   an indicator pin having a first end facing the piston, a second end outside the storage chamber and a central portion slidably mounted in a body of material forming a seal for the storage chamber.

8. A method for recovering a quantity of leakage grease of a lubricating-grease pump, comprising:
   accumulating a quantity of grease that has leaked from a pumping chamber in an accumulation chamber;
   guiding the leakage grease from the accumulation chamber into a storage chamber;
   varying the volume of the storage chamber by moving a piston within the storage chamber, and
   drawing the leakage grease from the storage chamber into the pumping chamber with an intake stroke of the lubricating grease pump.

9. A lubricating-grease pump comprising:
a pumping chamber;
a leakage accumulation chamber;
a seal configured to substantially seal the pumping chamber from the leakage accumulation chamber;
at least one outlet from the pumping chamber;
a first check valve in the at least one outlet configured to permit a unidirectional flow of grease out of the pumping chamber;
a first passage connecting the leakage accumulation chamber to a storage chamber;
a second passage connecting the first passage to the pumping chamber;
a second check valve in the second passage;
a spring-biased piston in the storage chamber; and
an indicator pin having a first end facing the piston, a second end outside the storage chamber and a central portion slidably mounted in a body of material forming a seal for the storage chamber.

\* \* \* \* \*